United States Patent [19]

Sessody

[11] Patent Number: 4,671,746
[45] Date of Patent: Jun. 9, 1987

[54] BASE COMPONENT FOR A FLUID TRANSFER DEVICE AND METHOD OF MAKING THE COMPONENT

[75] Inventor: Donald W. Sessody, Brookfield, Wis.

[73] Assignee: Applied Power Inc., Brookfield, Wis.

[21] Appl. No.: 624,418

[22] Filed: Jun. 25, 1984

[51] Int. Cl.4 ............. F04B 21/00; B23P 15/00
[52] U.S. Cl. ................. 417/437; 417/DIG. 1; 29/156.4 R; 29/270; 29/458; 29/527.2; 264/274; 264/277; 264/279.1
[58] Field of Search ............. 29/156.4 R, 156.4 WL, 29/527.5, 527.2, 270, 458; 92/128, 169, 171; 264/277, 279.1, 274; 417/DIG. 1, 568, 440, 441, 53, 437; 60/477, 478

[56] References Cited

U.S. PATENT DOCUMENTS

| | | | |
|---|---|---|---|
| 1,693,520 | 11/1928 | Kondo | 29/156.4 WL |
| 2,496,292 | 2/1950 | Hook | 29/156.4 R |
| 2,547,055 | 4/1951 | Stephans | 417/440 |
| 3,288,079 | 11/1966 | Kling | 417/568 |
| 3,485,419 | 12/1969 | Taylor | 417/568 |
| 3,502,030 | 3/1970 | Bukewihge et al. | 417/423 R |
| 3,572,375 | 3/1971 | Rosenberg | 417/566 |
| 3,670,071 | 6/1972 | Walchle | 264/274 |
| 3,683,960 | 8/1972 | Kirsch | 264/277 |
| 3,822,966 | 7/1974 | McClocklin | 417/568 X |
| 3,827,122 | 8/1974 | Douglas | 29/527.1 |
| 3,864,801 | 2/1975 | Nakayama | 29/527.5 |
| 4,123,836 | 11/1978 | Buckell | 29/156.4 WL |
| 4,284,113 | 8/1981 | Nordlin | 60/479 |
| 4,304,533 | 12/1981 | Buckwell | 417/568 X |
| 4,357,798 | 11/1982 | Hung | 417/468 X |

FOREIGN PATENT DOCUMENTS

| | | | |
|---|---|---|---|
| 375066 | 5/1923 | Fed. Rep. of Germany | 92/169 |
| 2231873 | 12/1974 | France | |
| 158155 | 9/1982 | Japan | 92/171 |
| 876315 | 8/1961 | United Kingdom | |
| 2119867 | 11/1983 | United Kingdom | 417/568 |

Primary Examiner—Carlton R. Croyle
Assistant Examiner—Paul F. Neils
Attorney, Agent, or Firm—Andrus, Sceales, Starke & Sawall

[57] ABSTRACT

A base component for a fluid transfer device such as a hydraulic hand pump, cylinder or valve and a method of making the base component for such a device. The base component includes first and second base members having internal passages in communication with one another which subject the members to internal fluid pressure, and an encapsulating housing attaching the members together. In one form, the housing is composed of a moldable plastic material and surrounds both base members which are composed of extruded aluminum. In another form, the housing is integrally formed with one of the base members of a moldable plastic material and surrounds the other base member which is composed of extruded aluminum. In both forms structural members such as yoke members, which pivotally mount the piston and handle assemblies of a hand pump, may integrally be formed with the plastic housing. The method includes the steps of forming first and second base members having internal passages in fluid communication with each other, and encapsulating the base members with a moldable plastic material to attach the base members together. The encapsulation with plastic may either be performed as a separate step to attach the two base members or may be performed simultaneously with the forming of one of the base members so that the housing is integral therewith.

17 Claims, 17 Drawing Figures

BASE COMPONENT FOR A FLUID TRANSFER DEVICE AND METHOD OF MAKING THE COMPONENT

BACKGROUND OF THE INVENTION

The present invention relates to fluid transfer devices, and more particularly to a base component for a hydraulic hand pump and the method of making such a component.

Various types of fluid transfer devices are known. Examples of such devices include hydraulic hand pumps, cylinders and directional control valves all of which are useful in a wide variety of industries such as the construction and mining industries. The base components for such pumps, cylinders and valves are typically constructed of cast iron with the appropriate internal circuitry machined therein. However, cast iron is relatively heavy and this weight is undesirable for hand pumps which are designed to be portable. Additionally, cast iron readily conducts electricity and this characteristic is undesirable in some environments for safety reasons. Further, cast iron subjects machining tools to relatively high abrasive wear and is thus more expensive to machine than other metals such as aluminum. Also, molds for iron castings have a life expectancy which is significantly less than molds used with other types of materials such as plastic. This increases the relative cost of manufacturing when employing cast iron. It is therefore desirable to reduce the weight of such fluid transfer devices by employing lighter weight materials such as aluminum and moldable plastic and also take advantage of the reduced manufacturing costs accompanying the use of such materials.

One of the basic design criteria for a fluid transfer device is to employ a material of construction for the base or core components that will withstand the relatively high internal pressure developed during operation. Additionally, the material of construction must be able to withstand external structural loads applied against members projecting integrally from the base or core, as for example, the load applied against the integral yoke of a hand pump during the reciprocal movement of a piston and handle assembly, and be moldable or castable into various shapes. In the past these criteria necessitated the use of cast iron instead of cast aluminum or molded plastic since constructing a solid base or core component from these latter two materials resulted in relatively large voids which in turn diminished the structural integrity of the device. The use of projecting integral members also prevented the use of less expensive extrusion processes. It is therefore desirable to develop a fluid transfer device that would employ a base or core component made of extruded aluminum to withstand internal pressure, and projecting integral members of moldable plastic to take the external structural loads on the device.

Insert molding is well-known in the art. One type of insert molding employs a molding process wherein a cylindrical metal bushing is molded directly into a plastic component during the molding operation. The bushing is typically used with a fastener to prevent failure or fatigue cracking of the plastic material which would otherwise take the load when the component is fastened to another structure.

Encapsulation processes employing a moldable plastic material are also well-known in the art as shown by U.S. Pat. No. 2,618,689, as is the molding of plastic components in a mold utilizing a preform as the core of the mold as shown in U.S. Pat. No. 3,355,772.

SUMMARY OF THE INVENTION

A base component for fluid transfer devices such as hydraulic hand pumps, cylinders, valves and the like, and a method of making said component.

The base component includes a first base member having a first internal passage for receiving pressurized fluid which subjects the first base member to internal fluid pressure, a second base member having a second internal passage in communication with the first internal passage which also subjects said second base member to internal fluid pressure, and attachment means for attaching the first and second base members together including means encapsulating the base members to form a housing thereabout. In one form, the first and second base members are both composed of extruded aluminum while the attachment means is composed of a moldable plastic material such as 43–50% glass reinforced nylon. In another form, one of the base members is composed of extruded aluminum while the second base member is composed of a plastic material and the attachment means is integrally formed in one piece with the second base member.

The method includes the steps of forming a first base member having a first internal passage for receiving pressurized fluid which subjects the first base member to internal pressure, forming a second base member having a second internal passage for receiving pressurized fluid which subjects the second base member to internal fluid pressure, and encapsulating the base members with a moldable plastic material to attach the first and second base members together with the first and second internal passages in fluid communication with one another. The encapsulation step may also be performed simultaneously with the forming of the second base member to form a housing integral with the second base member which surrounds the first base member. The method may further include the step of forming simultaneously during the encapsulation an integral portion adapted to be subjected to a mechanical load applied externally of the base members.

The method may be employed to make a base for a hydraulic hand pump wherein the base is extruded from aluminum and the integral portion is a yoke member adapted to pivotally receive a handle assembly operative upon reciprocation to transfer hydraulic fluid from a source through the base to a hydraulically actuatable device. Both the yoke member and encapsulating housing are preferably composed of nylon reinforced with 43–50% glass.

The present invention thus provides a base component for a fluid transfer device and a method of making the same which provides a metal structure that forms the core of the device for withstanding internal pressure and structural components molded of a plastic material designed to take the external structural loads of the device. The base component is light in weight and less costly to manufacture than prior cast iron bases.

BRIEF DESCRIPTION OF THE DRAWINGS

The drawings illustrates the best mode presently contemplated of carrying out the invention.

In the drawings.

DESCRIPTION OF THE PREFERRED EMBODIMENT

Figure 1:
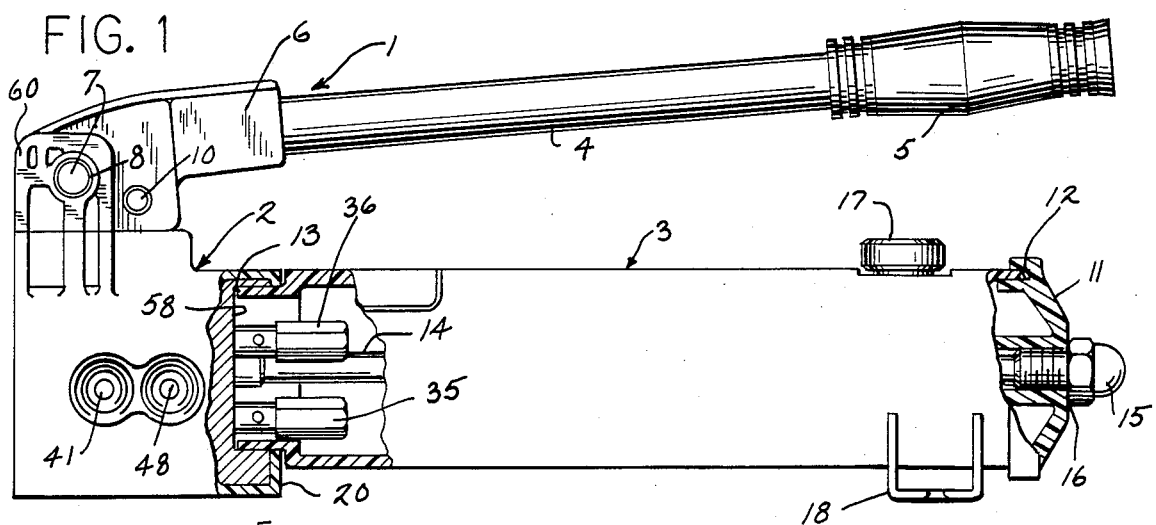
FIG. 1 is a side view in elevation with parts broken away and in section illustrating a hydraulic hand pump incorporating a base constructed in accordance with the principles of the present invention.
Figure 2:
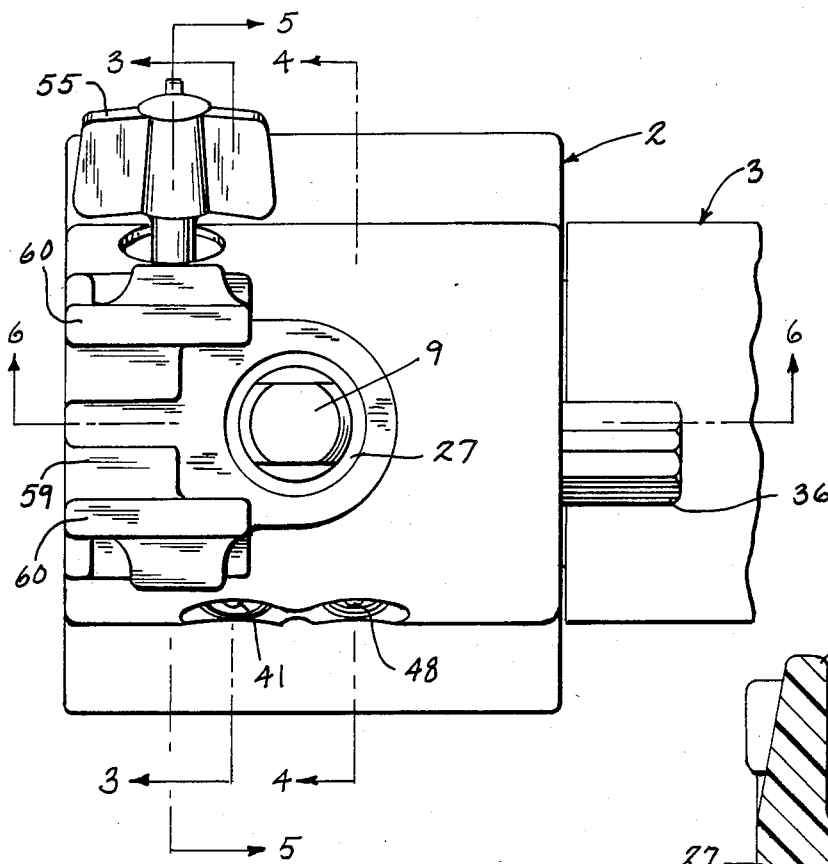
FIG. 2 is a top plan view of the pump of FIG. 1 with the handle assembly removed and the reservoir partially shown.

Referring now to the drawings, FIGS. 1 and 2 show a hydraulic hand pump having a base or core component constructed in accordance with the principles of the present invention. It should be noted that although FIGS. 1-6 illustrate a hydraulic hand pump the principles of the present invention may be applied to a wide variety of fluid transfer devices. A fluid transfer device may be defined as a device or apparatus that regulates the flow or pressure of a fluid, such as hydraulic fluid. Thus, the term "fluid transfer device" encompasses structures such as pumps, valves, cylinders and like devices.

The hand pump shown in FIGS. 1 and 2 includes a handle assembly 1, a base 2, and a reservoir 3. Handle assembly 1 includes a handle 4 having a grip 5 which is connected to a beam 6 which in turn is pivotally connected to base 2. The pivotal connection of beam 6 to base 2 is provided by a beam pin 7 which is held in place by a retaining ring 8. Beam 6 is operatively connected to a piston 9 (see FIG. 6) by means of a cross pin 10. Reciprocal pivotal movement of handle 4 about pin 7 thus results in the reciprocal sliding movement of piston 9, as will hereinafter be described.

Reservoir 3 is a cylindrical hollow member which functions as a source of hydraulic fluid for the hand pump. Reservoir 3 is closed at one end by means of an end cap 11 and sealed against leakage of fluid by means of a ring 12 positioned between cap 11 and the end of reservoir 3. The opposite end of reservoir 3 is telescopically received within base 2 and sealed with a gasket 13. Reservoir 3 is mounted on base 2 by means of a tie rod 14 which extends from base 2 through the center of reservoir 3 and cap 11. Cap 11 and reservoir 3 are held in position by an acorn nut 15 and the central opening through cap 11 is sealed by a gasket 16. Reservoir 3 may be filled through an opening which is sealed during use by a vent cap 17. Legs 18 are mounted to one end of reservoir 3 to stabilize the hand pump and also permit the hand pump to be bolted to a supporting structure if desired.

Figure 3:
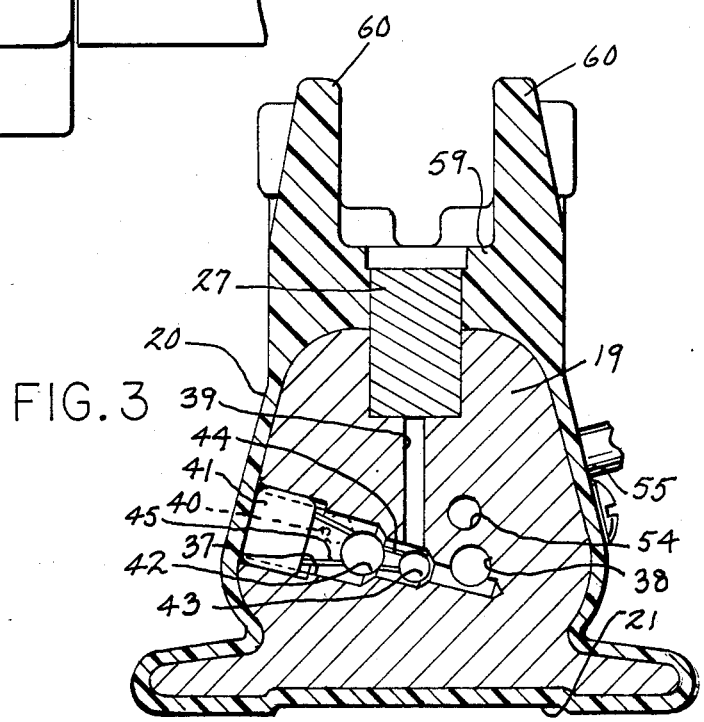
FIG. 3 is a cross-sectional view taken along the plane of the line 3—3 in FIG. 2.

Base 2 includes a base member or core 19 and a housing 20. Member 19 is composed of solid aluminum and is formed by an extrusion process. Although aluminum is the preferred material of composition and extrusion is the preferred manner of making member 19, other materials such as steel or plastic might conceivably be used and other processes such as machining, molding, or casting (depending upon the material of composition) might also be conceivably used to manufacture member 19. Base member 19 includes an upper portion in which is formed a plurality of internal passages or cavities for receiving hydraulic fluid from reservoir 3 which subjects base member 19 to an internal fluid pressure, and further includes an integral lower portion comprising legs for stabilizing the hand pump. As shown in FIG. 3, the legs are formed with a relief 21 so as to prevent lateral rocking of the hand pump. As seen best in FIG. 2, the legs of base member 19 extend along the entire length of both sides of base member 19.

Figure 6:
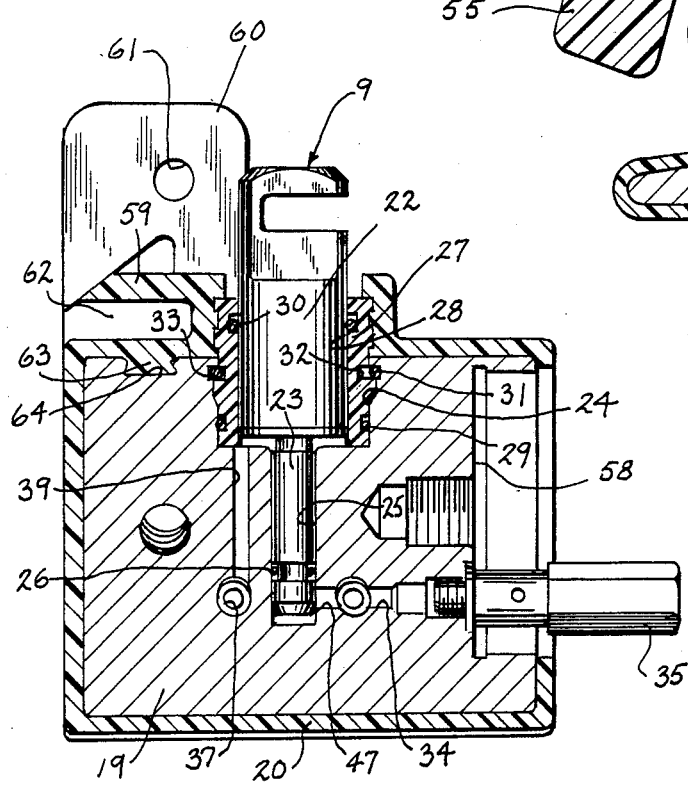
FIG. 6 is a cross-sectional view taken along the plane of the line 6—6 in FIG. 2.

The hand pump illustrated is a two-stage pump and as such, piston 9 includes a low pressure plunger 22 and a high pressure plunger 23, as shown best in FIG. 6. Plunger 22 has a larger diameter than plunger 23 and is received within a bore 28 of a second base member 27 which in turn is received within a bore 24 formed in the upper end of base member 19. In turn, plunger 23 is received within a bore 25 which communicates with bore 28 and which is of smaller diameter than bore 28. An O-ring 26 positioned at the lower end of plunger 23 prevents leakage through bore 25.

Second base member 27 is in the form of a cylindrical sleeve and is positioned within bore 24 having one end seated on the bottom of bore 24 and the other end projecting above the outer surface of base member 19. Sleeve 27 defines a bore 28 for slidably receiving plunger 22. An O-ring 29 positioned around the lower end of sleeve 27 prevents oil leakage between sleeve 27 and base member 19, and another O-ring 30 positioned at the upper end of sleeve 27 prevents oil leakage between sleeve 27 and plunger 22. A snap ring 31 is located in complementary annular grooves 32, 33 formed in sleeve 27 and base member 19 respectively. Snap ring 31 functions to hold sleeve 27 within bore 24 prior to the encapsulation of base member 19 with housing 20, as will hereinafter be described.

As shown best in FIGS. 1 and 6, a bore 34 communicates between the lower end of bore 25 and reservoir 3. A safety or relief valve 35 is positioned in bore 34 and is typically set to relieve pressure at 10,500–11,000 psi. A bore 34a (see FIG. 9) also communicates between bore 24 and reservoir 3, and contains a safety or relief valve 36 (see FIG. 1) which is set to relieve pressure at about 200-250 psi. Thus, plunger 22 is typically employed to quickly move a hydraulic cylinder or other hydraulically actuated device to an initial position of engagement with a structure to be lifted or supported. This is typically called the first stage or lower pressure stage of operation. As piston 9 continues to reciprocate, relief valve 36 opens and the pressure built up by plunger 23 during this second stage of operation is employed to actually lift or support an object.

Referring now to FIG. 3, base member 19 includes a low pressure passage or cavity 37 machined therein which includes three sections having decreasing diameters. The inner section has the smallest diameter and communicates with an oil intake passage 38. Passage 38 opens into reservoir 3 and extends longitudinally through base member 19. The middle section of cavity 37 communicates with an oil feed passage 39 which opens into bore 28. The outer section has the largest diameter and communicates with an oil outlet passage 40. Cavity 37 opens to the outer surface of base member 19 and is closed during operation by a threaded plug 41. The decreasing diameters of the middle and lower sections of cavity 37 form a pair of annular shoulders upon which are seated a pair of balls 42 and 43, respectively. A spring 44 between balls 42 and 43 normally maintains ball 43 in a seated closed position, and a spring 45 between ball 42 and plug 41 normally maintains ball 42 in a seated closed position.

Figure 4:
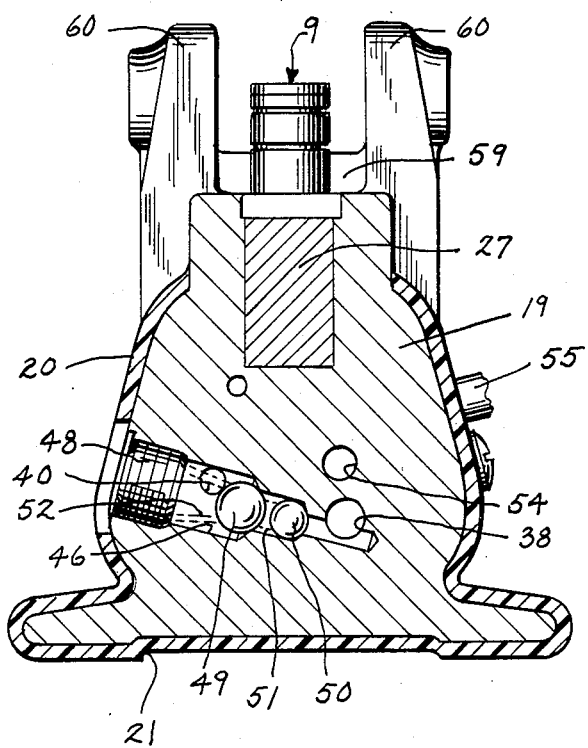
FIG. 4 is a cross-sectional view taken along the plane of the line 4—4 in FIG. 2.

Referring now to FIG. 4, base member 19 also includes a high pressure passage or cavity 46 machined therein. Cavity 46 is identical to low pressure cavity 37 and is also formed with three sections of decreasing diameter. The inner section of cavity 46 communicates with oil intake passage 38 while the middle section communicates with an oil feed passage 47 and the outer section communicates with oil outlet passage 40. Cavity 46 is closed by a threaded plug 48 and a pair of balls 49 and 50 are normally seated against the annular shoulders formed between the sections of cavity 46 by means of springs 51 and 52, respectively, in a manner similar to that described for cavity 37.

Figure 5:
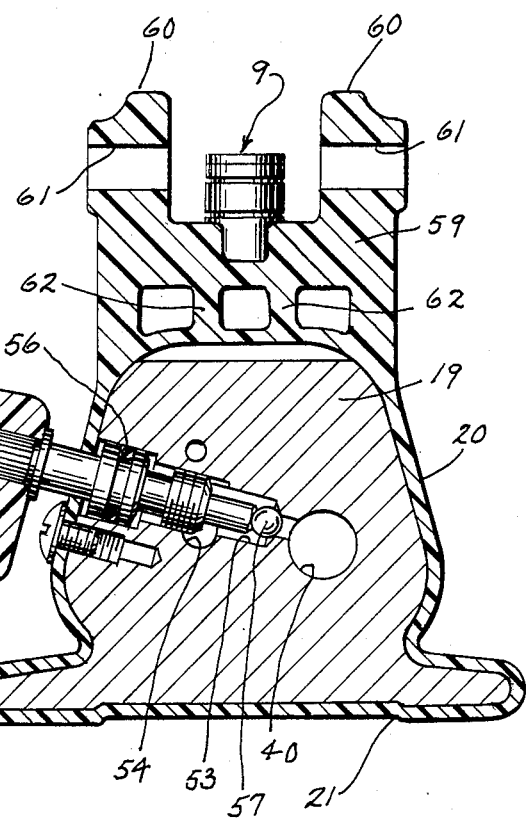
FIG. 5 is a cross-sectional view taken along the plane of the line 5—5 in FIG. 2.

Referring now to FIG. 5, base member 19 also includes a third passage or cavity 53 extending inwardly from the opposite side from that of cavities 37 and 46. Cavity 53 communicates at its inner end with oil outlet passage 40, and also communicates at a point intermediate its length with an oil feedback passage 54 which in turn communicates with reservoir 3. A spindle 55 is threadedly engaged within cavity 53 and an O-ring 56 prevents oil leakage around spindle 55. The lower end of cavity 53 has a portion of reduced diameter which forms an annular shoulder that provides a seat for a ball 57 which is located between the annular shoulder and the lower end of spindle 55.

In operation, in order to utilize the hand pump with a hydraulic cylinder to lift an object the spindle 55 must be turned down into cavity 53 to seat ball 57 and thus block communication between outlet passage 40 and feedback passage 54. Handle 4 may then be lifted upwardly i.e. pivoted counterclockwise about pin 7 in FIG. 1. As handle 4 moves upwardly, piston 9 also moves upwardly to create a suction in oil feed passage 39 which in turn moves ball 43 off its seat to draw oil from reservoir 3 through intake passage 38 and the lower end of cavity 37. At the same time, a suction is drawn upon high pressure feed passage 47 which moves ball 50 off its seat to draw oil from reservoir 3 through oil intake passage 38 and the lower end of cavity 46. Thus, upon the intake stroke of handle 4 oil is drawn into the space beneath plungers 22 and 23 in bores 25 and 28 respectively.

Upon the downward stroke of handle 4, piston 9 moves downwardly so that oil is fed through passage 39 into cavity 37 which seats ball 43 and unseats ball 42 so that oil may pass through outlet passage 40 to the hydraulic cylinder. At the same time, oil is forced through passage 47 into cavity 46 to seat ball 50 and unseat ball 49 so that oil is forced into outlet passage 40 via plunger 23. The reciprocation of piston 9 is continued until the cylinder switches from its first stage or lower pressure stage of operation to its second or high pressure stage of operation, as previously described, and has lifted the object to the desired position.

In order to lower the object and release the pressure on the cylinder, spindle 55 is rotated so that ball 57 becomes unseated thus allowing oil to flow from the cylinder through outlet passage 40, cavity 53 and feedback passage 54 into reservoir 3.

Housing 20 is comprised of a moldable plastic material, preferably 43-50% glass reinforced nylon available from DuPont under the trade designation GRZ 70G 43L, i.e. glass reinforced "Zytel" nylon. A "moldable plastic material" may be defined as an "engineering plastic" and includes thermosetting plastics such as alkydes, allyl resins, epoxies, phenolics, amino resins and polyesters, as well as thermoplastics such as polyethylene, polyvinylchloride, polypropylene, ABS resins, acrylics, acetals, nylons (polyamides), polycarbonate, fluoroplastics, as well as others. Typically, such plastic material should be glass reinforced having a tensile strength of about 30,000 psi at 73° F., dry as molded (ASTM D638), an elongation at break at 73° F., dry as molded of about 2% (ASTM D638), and a shear strength at 73° F. dry as molded of at least 10,000 psi (ASTM D732). Also, such material should have an Izod impact strength of about 2.5 ft-lbs per inch at 73° F. dry as molded in accordance with ASTM (the American Society for Testing Materials) testing method D256.

Housing 20 completely encapsulates base member 19 and covers all surfaces with the exception of the outlets of cavities 37, 46, and 53, outlet passage 40 and recessed circular pocket 58 which receives the end of reservoir 3. Specifically, housing 20 completely surrounds the projecting portion of sleeve 27 to solidly connect sleeve 27 to base member 19. It should be noted that housing 20 is preferably injection molded, and as such plastic material will be forced into annular grooves 32 and 33 to aid snap ring 31 in securely holding sleeve 27 in place. In addition to injection molding, other molding techniques such as shrink fitting might also be employed to form housing 20.

Housing 20 also includes an integral portion or yoke member 59 which projects upwardly from the top surface thereof to from a pair of ears 60. Ears 60 include a pair of aligned openings 61 for receiving beam pin 7. As shown best in FIGS. 5 and 6, yoke member 59 is reinforced by a plurality of ribs 62 extending between member 59 and base 19 which are also integrally molded simultaneously with housing 20 and yoke member 59. Housing 20 also includes a flaring tenon 63 and base member 19 includes a mortise 64 into which tenon 63 tightly fits to make an interlocking dovetail joint between housing 20 and base member 19. This dovetail connection extends laterally across the top of base 2 beneath yoke member 59 and functions to aid in anchoring this end of housing 20 to base member 19. This anchor is believed necessary due to the torque developed during the mechanical loading of yoke member 59, i.e. during the downward pumping stroke of handle assembly 1.

Figure 7:
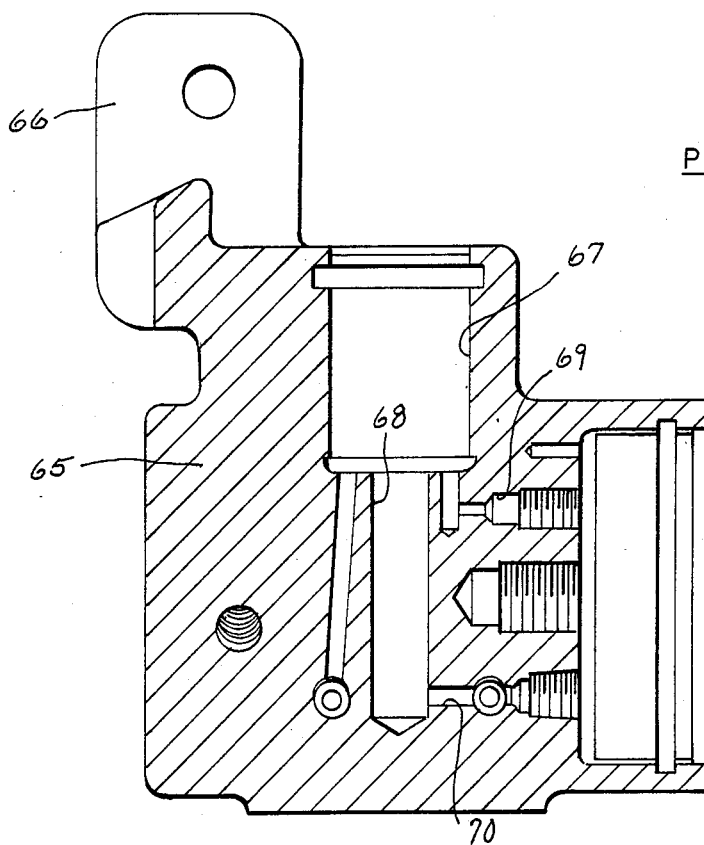
FIG. 7 is a cross sectional side view in elevation similar to FIG. 6 showing a prior art base for a hydraulic hand pump.

FIG. 7 illustrates a typical prior art base or core component for the hydraulic hand pump shown in FIG. 1. Unlike the base or core described and illustrated with respect to FIGS. 2–6, the base or core of FIG. 7 is composed of a one-piece cast iron body 65 which includes an integral yoke 66 for pivotally receiving a piston and handle assembly for the hand pump in a manner similar to that shown in FIG. 1. As shown, body 65 is designed for use with a two-stage hand pump and thus includes an upper low pressure bore 67 communicating with a co-axial high pressure bore 68 for slidably receiving a piston (not shown). Body 65 also includes a low pressure passage 69 and a high pressure passage 70 communicating respectively with bores 67 and 68 in a manner similar to that described with respect to FIG. 6. Unlike the base component of FIGS. 2–6, the base component of FIG. 7 does not include the plastic housing 20 nor the sleeve 27 and is not extruded from aluminum but is cast from iron.

Referring once again to FIGS. 2–6, after base member 19 is extruded into the illustrated shape and after the various cavities, passageways and bores are machined therein, sleeve 27 is inserted into bore 24 until snap ring 31 snaps into place in annular groove 33 so that sleeve 27 is held therein. Base member 19 and sleeve 27 are then placed within a mold in preparation for molding housing 20.

Figure 9:
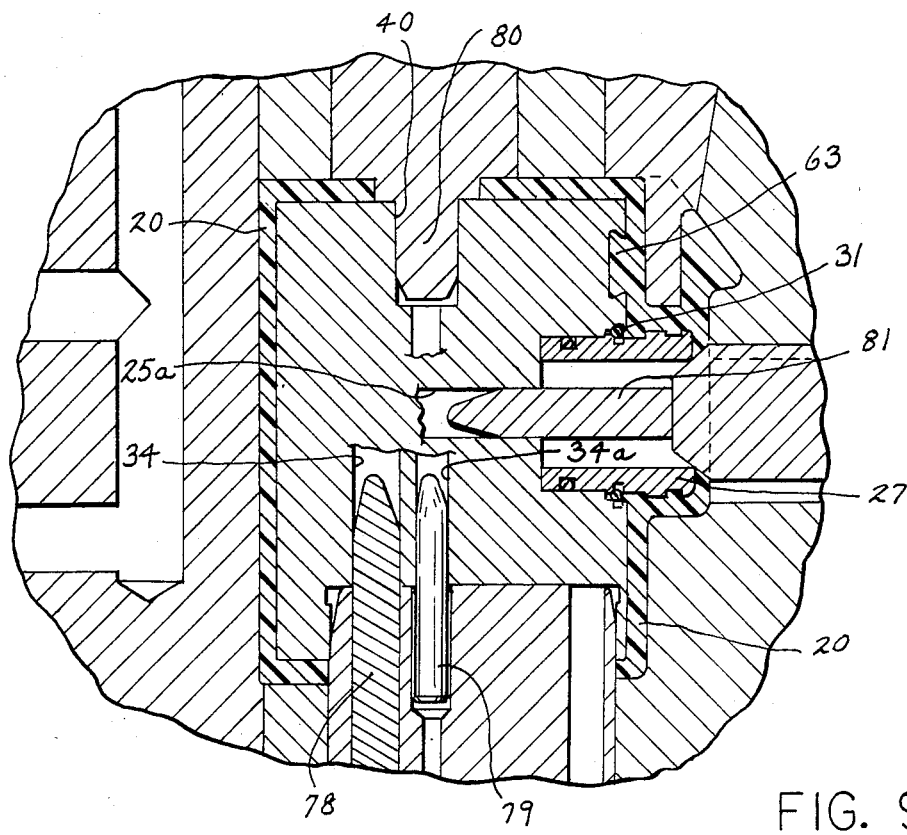
FIG. 9 is an enlarged fragmentary cross sectional view through the mold and base of FIGS. 1-6.
Figure 8:
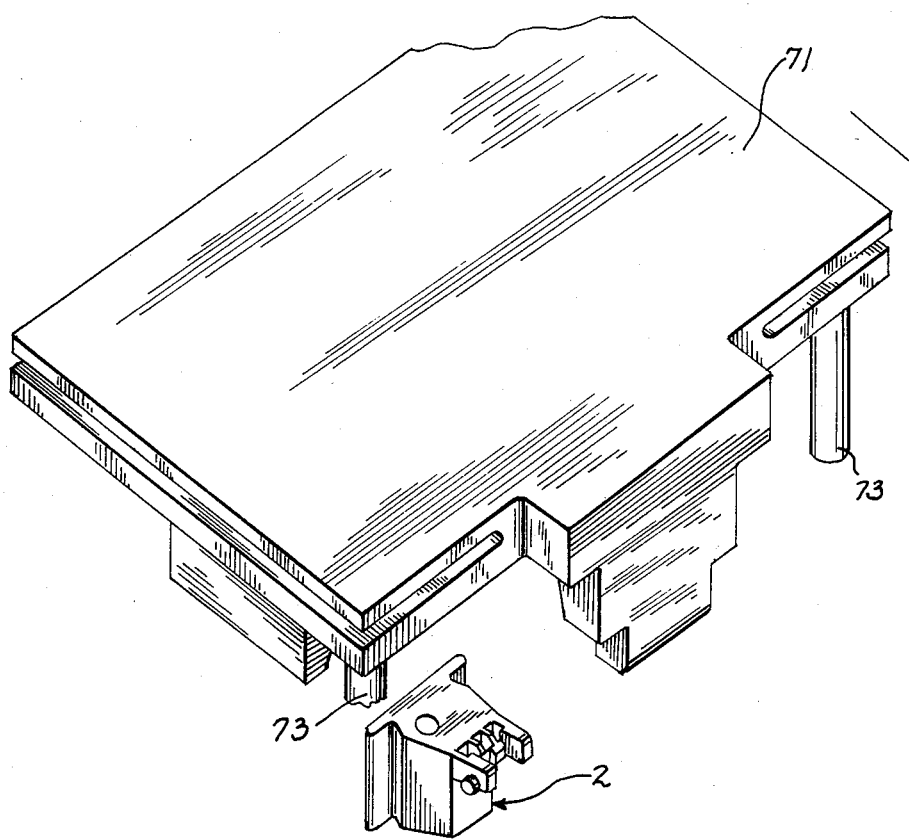
FIG. 8 is an exploded perspective view showing the top and bottom halves of a mold for making the base shown in FIGS. 1-6 with the base therebetween.
Figure 8:
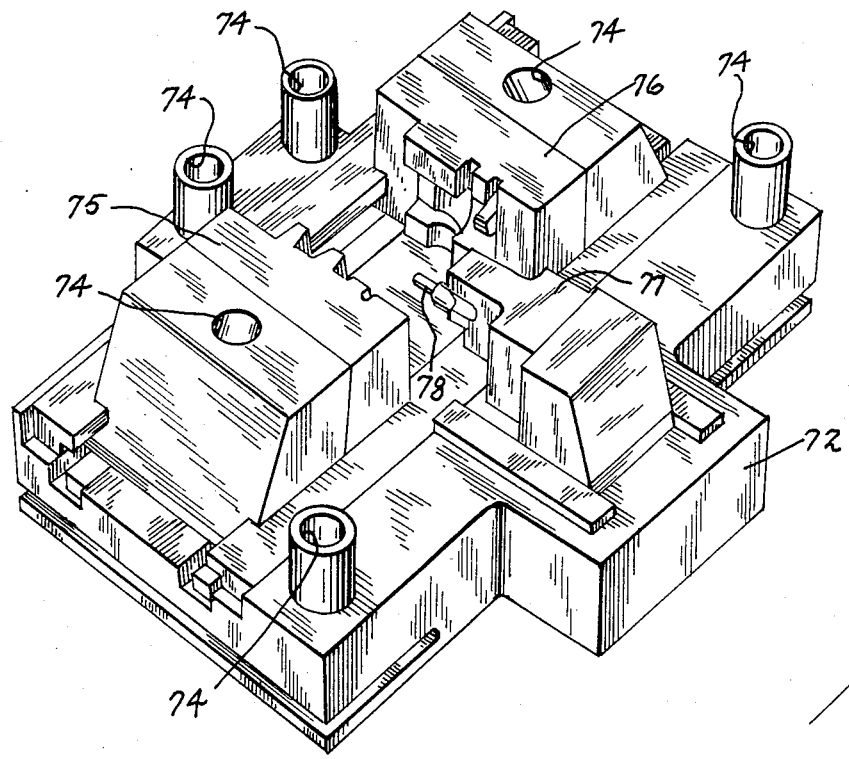

The mold is shown in FIG. 8 and includes a top half 71 and a bottom half 72. The two halves 71 and 72 may be held tightly together during the molding operation by any suitable means. In FIG. 8, the halves 71 and 72 of the mold are shown separated with top half 71 carrying a plurality of dowel pins 73 for insertion into holes 74 in the bottom half 72 so as to assure proper alignment of the two halves of the mold when they are brought together. Between the two halves 71 and 72 of the mold is shown a completed base 2. However, prior to the molding of housing 20 around base member 19, base member 19 is inserted in the center opening between three movable dies 75, 76 and 77 which are mounted on bottom half 72 of the mold. As shown in FIG. 9, when dies 75–77 come together plugs 78, 79 and 80 are inserted into high pressure relief bore 34, low pressure relief bore 34a and oil outlet passage 40, respectively, so that plastic will not flow into these passages during the molding operation. Note also that pocket 58 is plugged by die 75. Simultaneously, a finger or rod 81 is inserted through bore 28 in sleeve 27 into bore 25 to align bore 28 with bore 25. The mold is then closed and a plastic moldable material is forced into the mold under pressure until all the space in the mold not occupied by the base member 19 and sleeve 27, which act as the core of the mold, is filled with the plastic material. After curing, the mold is separated and base 2 is removed from the mold. In this manner housing 20 including yoke member 59 are integrally formed on the first base member or core 19, and the second base member or sleeve 27 is securely coupled to core 19.

Figure 10:
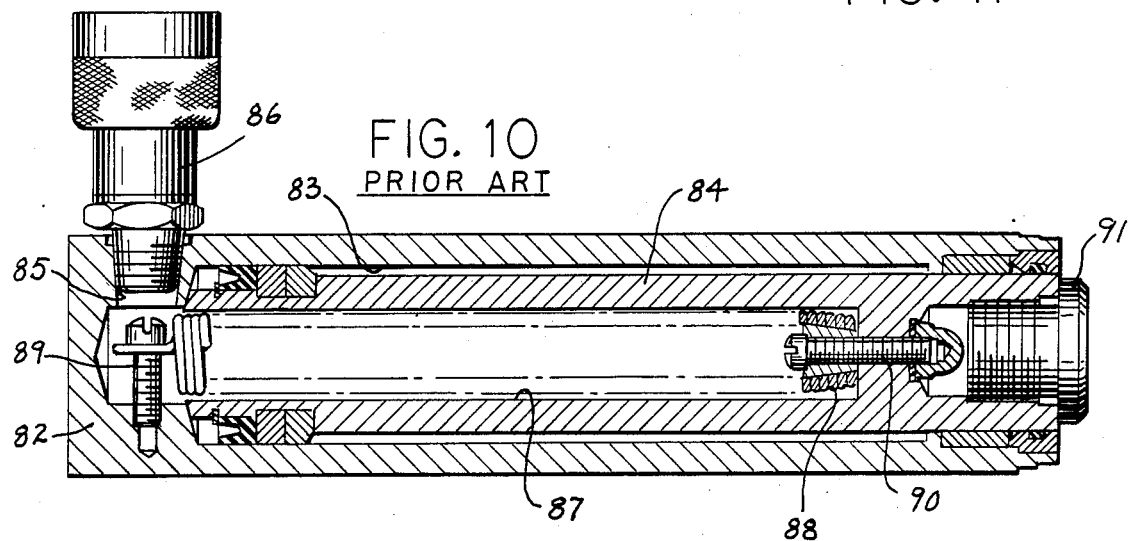
FIG. 10 is a cross sectional side view in elevation illustrating a prior art base for a hydraulic cylinder.

Referring now to FIG. 10, there is shown a prior art fluid transfer device in the form of a hydraulic cylinder. The cylinder shown includes a cylindrical base 82 defining a central passage 83 for slidably receiving a piston or plunger 84. An inlet passage 85 communicates with one end of central passage 83 in which is inserted a coupler 86 for making connection to a source of hydraulic fluid under pressure (not shown). Plunger 84 also includes a central opening 87 in which is disposed a spring 88 anchored at one end by a bolt 89 to base 82 and at its other end by a bolt 90 to plunger 84. A saddle assembly 91 is attached to the outer end of plunger 84 for engagement with a structure to be raised or supported by the cylinder. Plunger 84 is shown in its retracted position and may be extended by forcing fluid under pressure through coupler 86 into central opening 87, and may be retracted again by removing pressurized fluid so that spring 88 together with the force of the structure being lifted or supported forces plunger 84 back to the position shown in FIG. 10.

Figure 11:
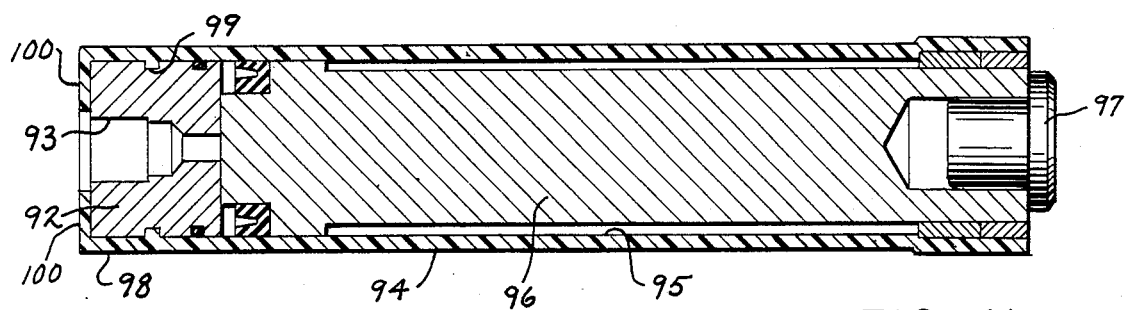
FIG. 11 is a cross sectional side view in elevation illustrating a hydraulic cylinder incorporating a base constructed in accordance with the principles of the present invention.

Referring now to FIG. 11, there is illustrated a fluid transfer device in the form of a hydraulic cylinder having a base component constructed in accordance with the principles of the present invention. The cylinder of FIG. 11 includes a first base member 92 constructed of extruded aluminum having a central inlet passage 93 therein, and a cylindrical second base member or cylinder member 94 constructed of a moldable plastic material. Cylinder member 94 defines a central passage 95 which slidably receives a plunger 96 having a saddle assembly 97 at its outer end. Cylinder member 94 is attached to base member 92 by means of a housing 98 formed integrally with cylinder member 94 of a moldable plastic material. Housing 98 completely surrounds base member 92 and is anchored thereto by means of an annular mortise and tenon arrangement 99 together with the flange portion 100 about the edges of base member 92. In operation, plunger 96 is extended by forcing hydraulic fluid through inlet passage 93 and retracted by the force of the structure being supported or lifted acting against saddle assembly 97 and the removal of inlet pressure from passage 93.

Figure 12:
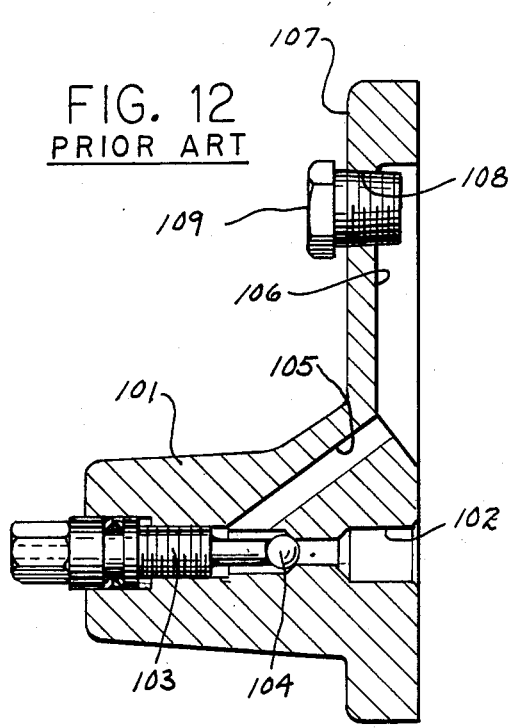
FIG. 12 is a cross sectional side view in elevation illustrating a prior art base for a hydraulic valve.

Referring now to FIG. 12, there is shown a prior art fluid transfer device in the form of a hydraulic valve. As shown, the valve includes a base 101 having a central passage 102 formed therethrough for receiving a valve stem 103 which may be threaded into base 101 to seat a ball 104 in passage 102 to prevent fluid flow therethrough or may be threaded out to permit fluid flow. Base 101 also includes a passage 105 communicating between passage 102 and a chamber 106 formed within a flange portion 107 of base 101. Chamber 106 communicates with an outlet passage 108 in which is inserted a coupler 109 for connection to a pipe or the like. Base 101 is composed of cast iron with passages 102, 105 and 108 machined therein.

Figure 13:
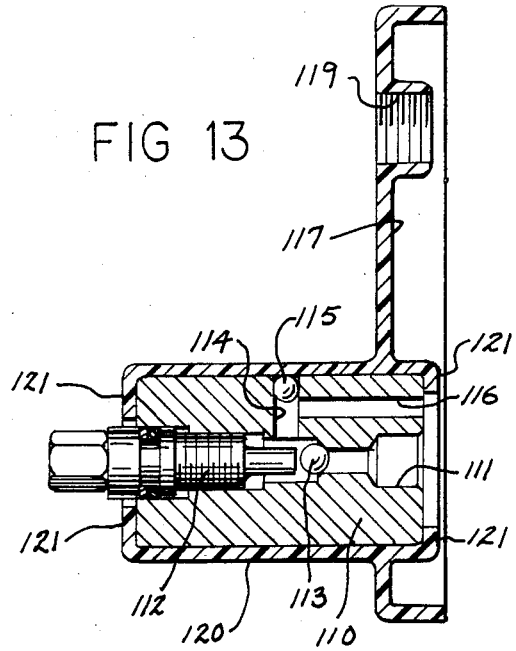
FIG. 13 is a cross sectional side view in elevation illustrating a hydraulic valve incorporating a base constructed in accordance with the principles of the present invention.

In contrast to the valves shown in FIG. 12, FIG. 13 shows a valve with a base component constructed in accordance with the principles of the present invention. The valve of FIG. 13 includes a first base member or valve block 110 constructed of extruded aluminum. Base member 110 includes a central passage 111 machined therein which receives a valve stem 112 which acts against a ball 113 in an identical manner as described with respect to FIG. 12. Base member 110 also includes a passage 114 communicating with central passage 111 and extending in a direction normal thereto. The outer end of passage 114 is plugged by a ball 115 which is friction fit therein. A passage 116 extending parallel to the axis of central passage 111 communicates between passage 114 and a chamber 117 formed by a second base member or mounting member 118. An outlet passage 119 communicates with chamber 117 and may be used with a coupler as in FIG. 12 to permit fluid flow to a pipe or the like. Second base member or mounting member 118 is constructed of a moldable plastic material and is connected to the aluminum base member 110 by means of a housing 120 which is integral therewith and surrounds base member 110. Housing 120 is thus formed simultaneously with the molding of mounting member 118 in a mold wherein base member 110 is the core. Member 118 is securely attached to member 110 by means of housing 120 together with flange portions 121 which overlap the inner and outer edges of base member 110.

Figure 14:
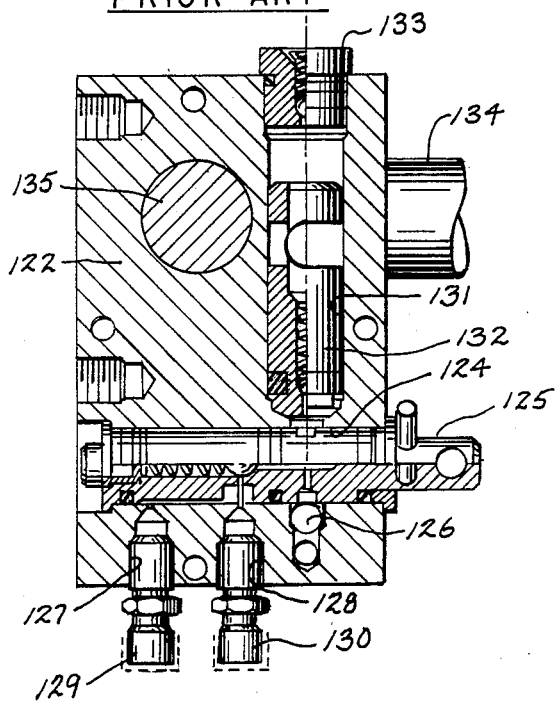
FIG. 14 is a cross sectional side view in elevation showing a prior art hydraulic hand pump.
Figure 15:
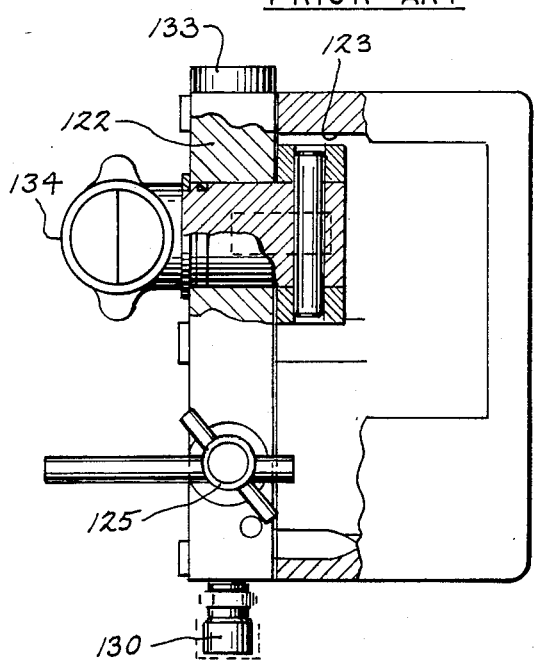
FIG. 15 is an end view with parts broken away and in section of the prior art hydraulic hand pump of FIG. 14.

Referring now to FIGS. 14 and 15, there is shown a prior art fluid transfer device in the form of a hand pump. The prior art hand pump shown in FIGS. 14 and 15 includes a base 122 constructed of cast iron connected to a reservoir 123. Base 122 includes a longitudinal passage 124 machined therein for receiving a rotatable valve element 125 therein. Passage 124 communicates with reservoir 123 by means of an inlet passage 126 and with a hydraulically actuatable device by means of pull port 127 and push port 128 shown with couplers 129 and 130 respectively therein. Passage 124 also communicates with another longitudinal passage 131 extending normal thereto and slidably receiving a piston or plunger 132. As shown in FIG. 14, the upper end of passage 131 is closed off by a relief plug 133. Plunger 132 is reciprocated within passage 131 by means of a handle 134 pivotally connected to base 122 as at 135. Thus, depending upon the position of valve element 125, the reciprocation of plunger 132 forces fluid through push port 128 or draws fluid through pull port 127 to raise and lower a structure.

Figure 16:
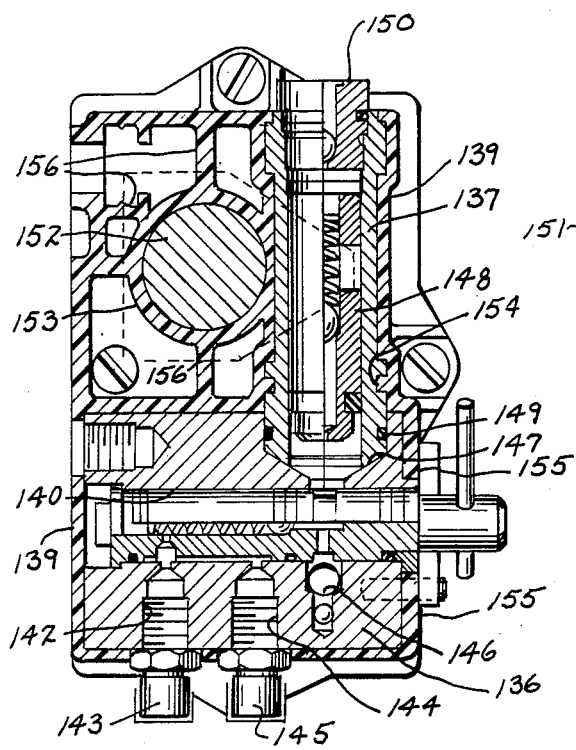
FIG. 16 is a cross sectional side view in elevation, similar to FIG. 14, except illustrating a second embodiment of a hydraulic hand pump constructed in accordance with the principles of the present invention.
Figure 17:
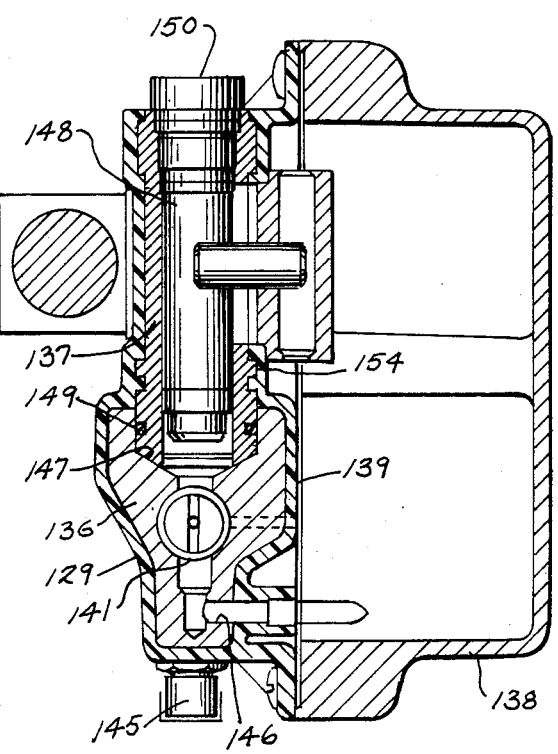
FIG. 17 is a cross sectional end view, similar to FIG. 15, of the hydraulic hand pump of FIG. 16.

Referring now to FIGS. 16 and 17, there is illustrated a fluid transfer device in the form of a hand pump including a base component constructed in accordance with the principles of the present invention. The hand pump illustrated includes a base member 136, a second base member 137 extending normal thereto, a reservoir 138 and an encapsulating housing 139 connected base members 136 and 137. Base member 136 is constructed of extruded aluminum and has therein a central passage 140 for receiving a rotatable valve element 141. Passage 140 communicates with a pull port 142 shown with coupler 143 therein, and a push port 144 shown with a coupler 145 therein. Passage 140 also communicates with reservoir 138 by means of inlet passage 146. Passage 140 also communicates with a cylindrical seat 147 extending normal thereto which opens to its outer surface and receives one end of second base member 137. Second base member 137 is in the form of a cylinder and slidably receives a piston or plunger 148. An O-ring 149 provides a fluid seal between base members 136 and 137. Cylindrical member 137 is capped at its upper end by a relief plug 150. Plunger 148 is reciprocated within member 137 by means of a handle 151 having a pivotal connection as at 152.

Housing 139 provides a means for coupling members 136 and 137 and also provides an integral yoke member 153 which receives the pivotal connection 152 of handle 151. Housing 139 completely encapsulates members 136 and 137. The coupling function of housing 139 is aided by means of an annular flange 154 extending into member 137 and by the flange members 155 extending around the edges of member 136. Yoke member 153 is reinforced by a plurality of ribs 156 integrally formed with housing 139.

The hand pump of FIGS. 16 and 17 is made by first extruding base members 136 and 137 and then machining the appropriate passages and structures therein. Member 137 is then seated within opening 147 and both members are inserted into a mold which forms housing 139 together with yoke 153 and ribs 156.

A base component for a fluid transfer device such as a hydraulic hand pump, cylinder or valve and a method of making a base component for such a device has been illustrated and described. Various modification and/or substitutions may be made to the components specifically described herein. For example, different types of thermosetting and thermoplastic materials may be employed and the component may be designed in various shapes as desired.

Various modes of carrying out the invention are contemplated as being within the scope of the following claims particularly pointing out and distinctly claiming the subject matter which is regarded as the invention.

I claim:

1. A hydraulic cylinder, comprising:
   a base member having a first internal passage formed therein for receiving pressurized fluid, said base member composed of a material having sufficient inherent strength to withstand said internal fluid pressure without deformation thereof;
   a cylinder member defining a second internal passage formed therein in communication with said first internal passage for receiving pressurized fluid, said cylinder member composed of a plastic material having sufficient inherent strength to withstand said fluid pressure without deformation thereof;
   attachment means for attaching said base and cylinder members together, said attachment means includes means integral with said cylinder member encapsulating said base member with said plastic material to form a housing thereabout, said housing thickness being substantially less than the thickness of said base member whereby said housing surrounds said base member without being subjected to said internal fluid pressure; and
   a piston mounted for reciprocal sliding movement within said first internal passage.

2. The cylinder of claim 1, further including fluid sealing means disposed between said base member and said cylinder member.

3. The cylinder of claim 1, wherein said cylinder member and encapsulating means are composed of a moldable plastic material, and said base member is composed of an extruded metal.

4. A base component for a fluid transfer device, said transfer device having an inlet, an outlet, a pump chamber and a piston mounted for reciprocation in said chamber to transfer hydraulic fluid from a source to a hydraulically actuatable device, said base component comprising:
   a first base member having a first internal passage for receiving pressurized fluid which subjects said first base member to internal fluid pressure, said first base member composed of a material having sufficient inherent strength to withstand said internal fluid pressure without deformation thereof;
   a second base member having a second internal passage in communication with said first internal passage which subjects said second base member to internal fluid pressure, said second base member composed of a material having sufficient inherent strength to withstand said internal fluid pressure without deformation thereof;

a third member supported by said first base member and composed of a plastic material of sufficient inherent strength to withstand a mechanical load applied thereto externally of said base members at a point spaced from said base members so that said mechanical load is transmitted to said first base member; and attachment means for attaching said third member as well as said first and second base members together, said attachment means includes means integral with said third member and encapsulating said base member with said plastic material to form a housing thereabout, said housing thickness being substantially less than the thickness of said first base member whereby said housing surrounds said base members without being subjected to said internal fluid pressure.

5. The base component of claim 4, wherein said first base member is composed of metal, said second base member is composed of a moldable plastic material, and said encapsulating means is integrally formed in one piece with said second base member.

6. The base component of claim 5, further including fluid sealing means disposed between said first and second base members.

7. The base component of claim 4, wherein said first and second base members are composed of metal and said attachment means is composed of a moldable plastic material.

8. The base component of claim 7, wherein said metal is extruded aluminum.

9. The base component of claim 7, further including fluid sealing means disposed between said first and second base members.

10. A method of making a base component for a fluid transfer device, said transfer device having an inlet, an outlet, a pump chamber and a piston mounted for reciprocation in said chamber to transfer hydraulic fluid from a source to a hydraulically actuatable device, said method comprising the steps of:

forming a first base member having a first internal passage for receiving pressurized fluid which subjects said first base member to internal fluid pressure, said first base member formed of a material having a sufficient inherent strength to withstand said internal fluid pressure without deformation thereof;

forming a second base member having a second internal passage for receiving pressurized fluid which subjects said second base member to internal fluid pressure, said second base member formed of a material having sufficient inherent strength to withstand said internal fluid pressure without deformation thereof;

encapsulating said base members with a moldable plastic material to attach said first and second base members together with said first and second internal passages in fluid communications with one another, said encapsulation forming a housing about said first base member having a thickness substantially less than the thickness of said first base member whereby said housing surrounds said first base member without being subjected to said internal pressure; and forming simultaneously from said plastic material during said encapsulation a third member integral with said housing and of sufficient inherent strength to withstand a mechanical load applied externally of said base members at a point spaced from said base members so that the application of said mechanical load is transmitted to said first base member.

11. The method of claim 10, wherein the encapsulation step is performed simultaneously with the forming of said second base member to form a housing integral with said second base member about said first base member.

12. The method of claim 10, wherein one of said base members is formed by an extrusion process.

13. A method of making a base component for a fluid transfer device, said transfer device having an inlet, an outlet, a pump chamber and a piston mounted for reciprocation in said chamber to transfer hydraulic fluid from a source to a hydraulically actuatable device, said method comprising the steps of:

forming a first base member having an internal passage for receiving pressurized fluid which subjects said first base member to internal fluid pressure, said first base member formed of a material having sufficient inherent strength to withstand said internal fluid pressure without deformation thereof;

forming a seat in said first base member;

forming a second base member having an internal passage therein for receiving pressurized fluid which subjects said second base member to internal fluid pressure, said second base member formed of a material having sufficient inherent strength to withstand said internal fluid pressure without deformation thereof;

inserting said second base member into said seat;

encapsulating said first and second base members with a moldable plastic material to form a housing thereabout and attach said first and second base members together with said first and second internal passages in fluid communication with one another, said housing thickness being substantially less than the thickness of said first base member whereby said housing surrounds said first base member without being subjected to said internal fluid pressure; and forming simultaneously with said housing from said plastic material an integral portion of sufficient inherent strenght to withstand a mechanical load applied externally of said first and second base members so that said mechanical load is transmitted to said first base member.

14. The method of claim 13, wherein said base members are formed by an extrusion process.

15. A method of making a base component for a hydraulic hand pump having an inlet, an outlet and a piston and handle assembly operative upon reciprocation to transfer hydraulic fluid from a source through said base component to a hydraulically actuatable device, comprising the steps of:

forming a base member having a plurality of internal passages for receiving pressurized hydraulic fluid which subjects said base member to internal fluid pressure, said base member formed of a material having sufficient inherent strength to withstand said internal fluid pressure without deformation thereof;

encapsulating said base member with a moldable plastic material to form a housing about said base member, said housing thickenss being substantially less than the thickness of said base member whereby said housing surrounds said base member without being subjected to said internal fluid pressure; and forming simultaneously with said housing from said plastic material an integral yoke member supported by said base member to pivotally receive the handle assembly.

16. The method of claim 15, further including the step of forming simultaneously with said housing a dovetail connection between said housing and said base member to aid in anchoring the housing to the base member.

17. The method of claim 15, wherein the step of forming said yoke member includes simultaneously forming a plurality of integral ribs interconnecting said yoke member and said housing.

* * * * *